March 24, 1936.     F. PFEIFFER, SR     2,034,956
COFFEEPOT
Filed June 16, 1934
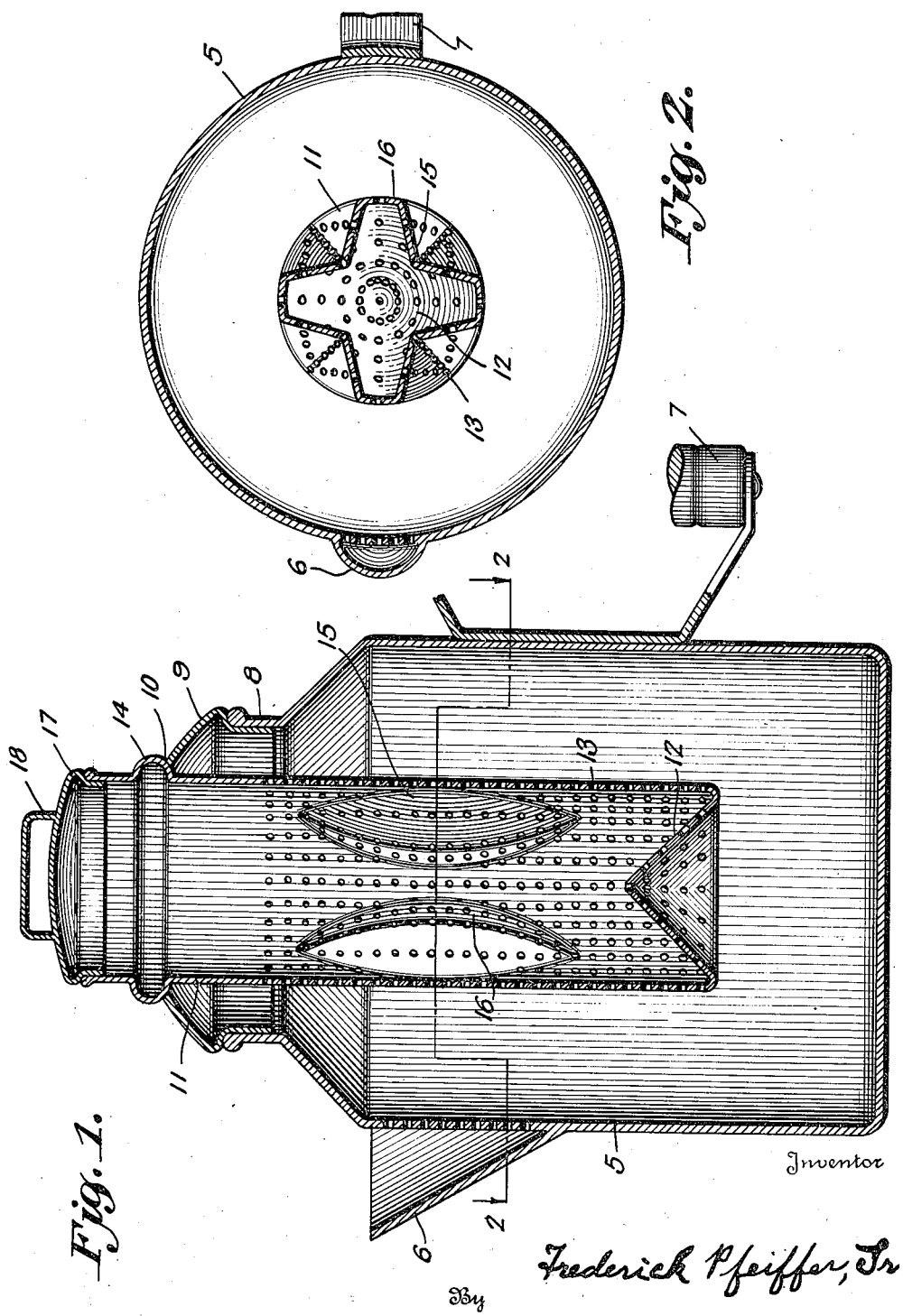
Inventor
Frederick Pfeiffer, Sr.
By
Attorney Patented Mar. 24, 1936

2,034,956

UNITED STATES PATENT OFFICE 2,034,956

COFFEEPOT

Frederick Pfeiffer, Sr., Freeport, N. Y.

Application June 16, 1934, Serial No. 730,887

2 Claims. (Cl. 53—3)

My invention relates to improvements in coffee and tea pots and has for its object to provide a pot having an inner receptacle in which the coffee or tea is contained, the receptacle being rockably and slidably mounted in the cover of the pot, to permit the contents to be agitated in the water whereby the flavor and aroma of the coffee or tea produced is materially improved.

A further object of the invention is to provide a device of the above-mentioned character which is simple and durable in construction, reliable and efficient in use and inexpensive to manufacture.

Other objects and advantages of the invention will be apparent during the course of the following description.

In the accompanying drawing, forming a part of this specification and in which like numerals are employed to designate like parts throughout the same, Fig. 1 is a longitudinal sectional view of a pot constructed in accordance with my invention, and, Fig. 2 is a horizontal section taken on line 2—2 of Fig. 1.

In the drawing, wherein for the purpose of illustration, I have shown a preferred embodiment of my invention, the numeral 5 denotes a coffee or tea pot having the usual pouring spout 6 and handle 7. The top of the pot is provided with a reduced neck 8, to receive the removable cover 9 having a central opening 10 having a beveled edge, through which the inner container or receptacle 11 is inserted into the pot. The receptacle 11 is of circular shape in cross section having a cone-shaped bottom 12 and the bottom and walls for the greater portion of their length are provided with a series of perforations 13. The side walls of said container when inserted in the pot are disposed in spaced relation to the beveled edge of the opening 10. An annular bead 14 is pressed from the walls of the receptacle near the upper end thereof which rests on the beveled edge of the opening 10, forming a ball and socket joint rockably suspending the receptacle from the cover 9, so that the receptacle is free to swing in all directions within the pot. The walls of the receptacle intermediate their length are provided with spaced elongated indentations 15, forming longitudinal vanes 16, as shown in Fig. 2, which serve to agitate the water in the pot when the receptacle is moved. A closure 17 is removably fitted in the upper end of the receptacle having a handle 18 attached thereto.

In use, water is placed in the pot 5 and allowed to come to a boil and then the receptacle 11 containing the coffee or tea is inserted through the opening 11 in the cover 9, into the pot. The receptacle is suspended from cover 9 by the bead 14 which permits the receptacle to be rocked back and forth agitating the water so that it thoroughly permeates the coffee or tea. The receptacle may also be rotated or moved up and down to agitate the water. When moved up or down the depression in the bottom creates a vacuum which increases the agitation of the water and when rotated the vanes 16 perform a similar function.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A coffee or tea pot including a body having a reduced open upper end, a removable cover fitted in the open end of said body having a central opening provided with a beveled edge, a cylindrical container of smaller diameter than the opening in said cover adapted to extend through the opening into said body, an annular bead of semi-circular shape in cross section surrounding said container adjacent the upper end thereof, adapted to rest on the beveled edge of the opening in the cover and support said container, said bead forming with the beveled edge a ball and socket joint between said container and cover to permit free swinging movement of the container in all lateral directions, the walls and bottom of said container being provided with perforations.

2. A coffee or tea pot including a body having a reduced open upper end, a removable cover fitted in the open end of said body having a central opening provided with a beveled edge, a cylindrical container of smaller diameter than the opening in said cover adapted to extend through the opening into said body, indentations around the walls of said container at spaced intervals, forming a plurality of vertical vanes, the walls and bottom of said container being provided with perforations, and an annular bead of semi-circular shape in cross section surrounding said container adjacent the upper end thereof, adapted to rest on the beveled edge of the opening in said cover, said bead forming with the beveled edge a ball and socket joint between the container and cover whereby said container is capable of free swinging movement in all lateral directions within said body.

FREDERICK PFEIFFER, Sr.